Nov. 8, 1932.    J. R. KONETSKY    1,886,557
MEANS FOR MOUNTING VEHICLE FRAMES
Filed June 19, 1929
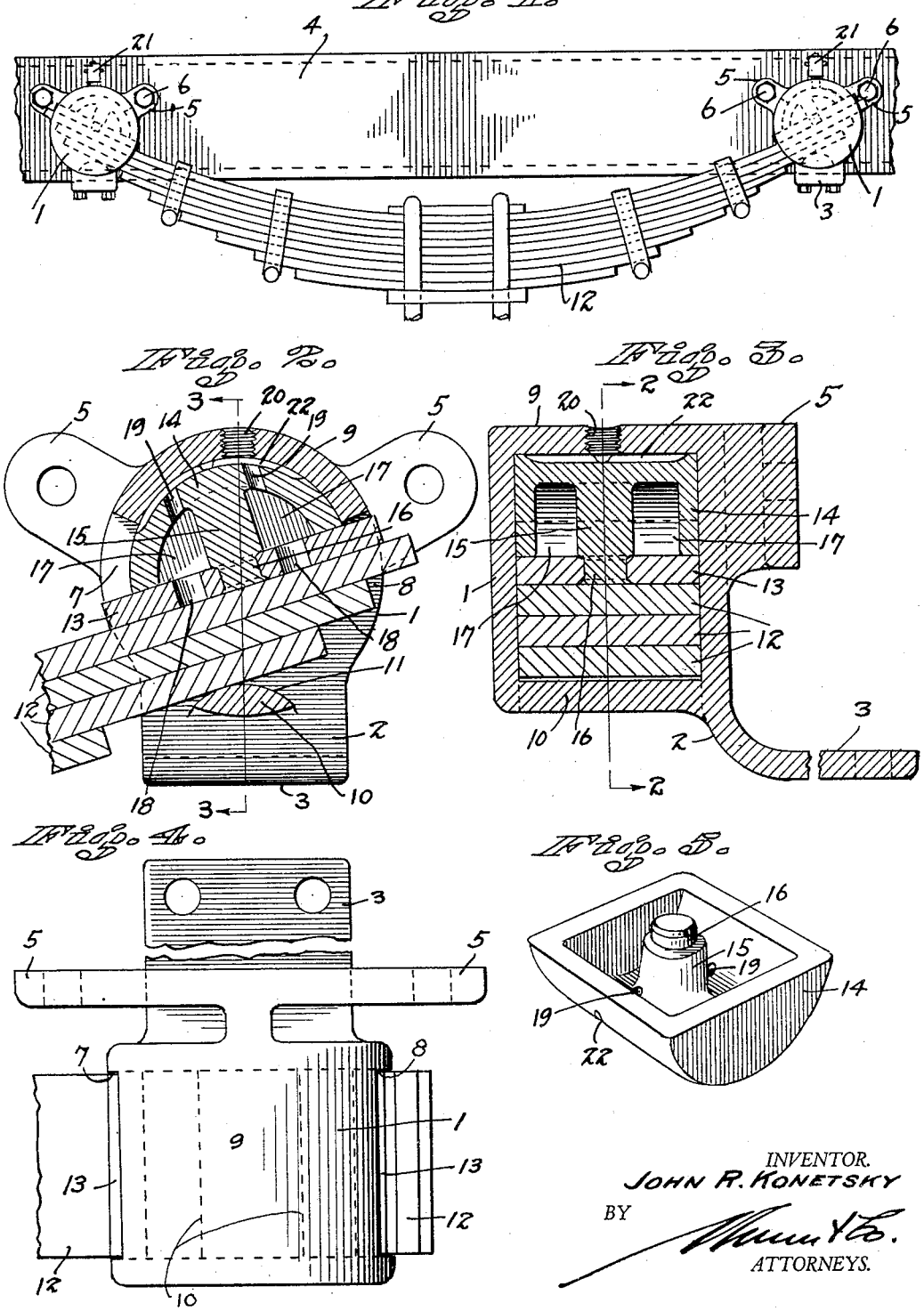
INVENTOR.
JOHN R. KONETSKY
BY
ATTORNEYS.

Patented Nov. 8, 1932

1,886,557

UNITED STATES PATENT OFFICE

JOHN R. KONETSKY, OF SAN FRANCISCO, CALIFORNIA

MEANS FOR MOUNTING VEHICLE FRAMES

Application filed June 19, 1929. Serial No. 372,067.

The present invention relates to improvements in means for mounting the frame of a vehicle on the springs thereof, and the principal object of the invention is to provide a means of the character described that is very simple in construction, may be cheaply manufactured and guaranteed long life and ability to sustain maximum loads.

More particularly, it is proposed in the present invention to provide a mounting means of the character described that allows a semi-elliptical spring to be used in its natural form without necessitating any reverse curves at the ends of the vehicle spring.

A further object of the invention is to provide a simple mounting means of the character described that does not require the interposition of shackles between the spring and the frame.

It is further proposed in the present invention to provide a mounting means of the character described that provides wide bearing surfaces and in addition thereto, means for permitting these bearing surfaces to be greased continually without much attention.

Further objects and advantages of my invention will appear as the specification proceeds.

The preferred form of my invention is illustrated in the accompanying drawing, in which Figure 1 shows a vehicle spring in side elevation having my mounting means attached to the ends thereof;

Figure 2, a longitudinal vertical section through my mounting means;

Figure 3, a transverse section taken along line 3—3 of Figure 2;

Figure 4, a top plan view of my mounting means; and

Figure 5, a perspective detail view of a bearing member used in my mounting means.

While I have shown only the preferred form of the invention, I wish to have it understood that various changes or modifications may be made within the scope of the claims hereto attached without departing from the spirit of the invention.

In its preferred form, my mounting means comprises a bracket 1 which may be substantically cylindrical in form and provided with a depending lug 2 terminating in a transverse member 3 adapted for fastening to the lower face of the frame member 4 and which has two lugs 5 extending from opposite sides in an upward direction and adapted for fastening to one side of the frame member by means of bolts 6, so that one end face of the bracket lies firmly against the side of the frame member and is fixedly secured thereto.

The bracket is formed with large slots 7 and 8 in the cylindrical surface thereof, each of the slots taking up substantially one-third of the surface, so that only the upper third of the cylinder is solid, as shown at 9, while at the same time the two end pieces of the cylinder are connected at the bottom by a cross piece 10 having a rounded upper surface, as shown at 11. The end 12 of the leaf spring, which may consist of three leaves, as indicated in the drawing, is adapted for introduction into this cylindrical bracket through the lateral slots thereof and has a plate 13 slidably resting thereon, the plate also extending through the entire bracket and substantially occupying a central or diametrical position relative to the cylinder. This plate 13 is fixed to the opening of a semi-cylindrical bearing member 14 adapted to be journaled in the upper section of the bracket 1 and secured to the plate 13 by means of a radial lug 15 having a neck section 16 anchored in the center of the plate. The bearing 14 is hollow except for the place occupied by the lug 15 and thus forms an annular grease chamber 17 which communicates with the bearing surface between the plate 13 and the upper spring leaf through apertures 18 and with the bearing surface between the bearing 14 and the upper section of the cylinder through apertures 19.

Grease may be admitted into the grease chamber 17 through a perforation 20, which latter may have an alemite fitting 21 fitted thereto and grooves 22 are provided in the upper face of the bearing 14 for better distribution of the grease.

The operation of my invention will be readily understood from the foregoing description.

The plate 13, which is firmly held to the bearing 14, is free to ride on the top leaf spring and is held thereto by the cross member 10 contacting the bottom face of the lower leaf spring, the cross member being rounded so as to allow the plate 13 to freely play on the upper leaf. The bearing 14 freely turns within the cylindrical bracket to allow for changes in position in response to spring action caused by shocks and vibrations. Grease may be freely admitted to the bearing surfaces from the grease chamber 17 and may be easily supplied through the alemite fitting 21. It will be noted that this construction is extremely rugged, the bearing surfaces being large and the connection between the frame and the spring being direct. Furthermore, my mounting means allows the springs to be used without any bending or reverse curves in the spring ends, which tends to extend the life of the springs.

It should be understood that various changes may be made, particularly in the form of the bracket, which might be made an integral part of the frame instead of an independent bracket, without departing from the spirit of the invention.

I claim:

1. Mounting means for a leaf spring comprising a cylindrical bracket, having openings on opposite sides to allow the spring end to extend therethrough, and a bearing overlying the spring and revolvable in the bracket, the bearing comprising a hollow, substantially semi-cylindrical member, a central radial stud therein and a bearing plate fastened to the stud and slidably overlying the spring end.

2. Mounting means for a leaf spring comprising a cylindrical bracket, having openings on opposite sides to allow the spring end to extend therethrough, and a bearing overlying the spring and revolvable in the bracket, the bearing comprising a hollow, substantially semi-cylindrical member, a central radial stud therein and a bearing plate fastened to the stud and slidably overlying the spring end, with means for admitting grease into the hollow member.

JOHN R. KONETSKY.